Figure 1:
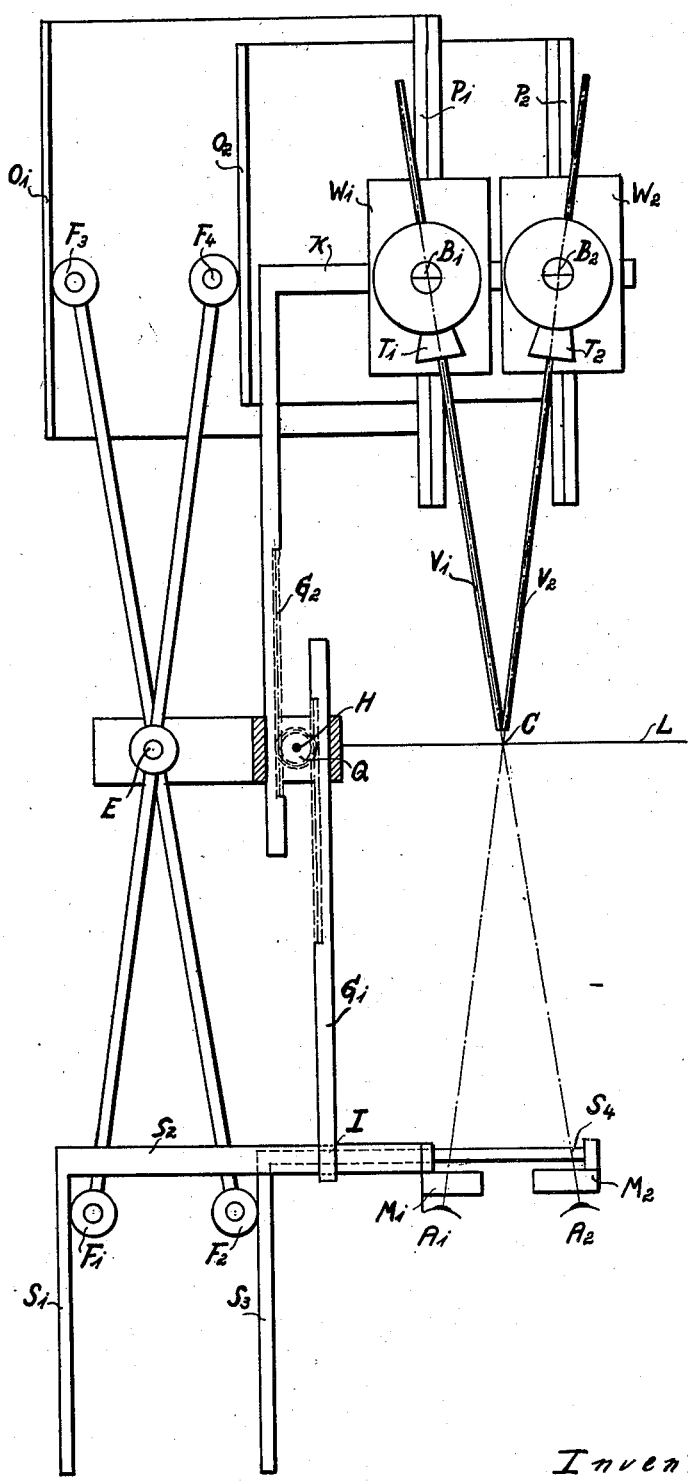

Nov. 12, 1929.  F. BORNHARDT  1,735,726
DEVICE FOR STEREOSCOPIC RONTGEN RAY FLUOROSCOPY
Filed Dec. 20, 1927  2 Sheets-Sheet 1

Inventor:
F. Bornhardt

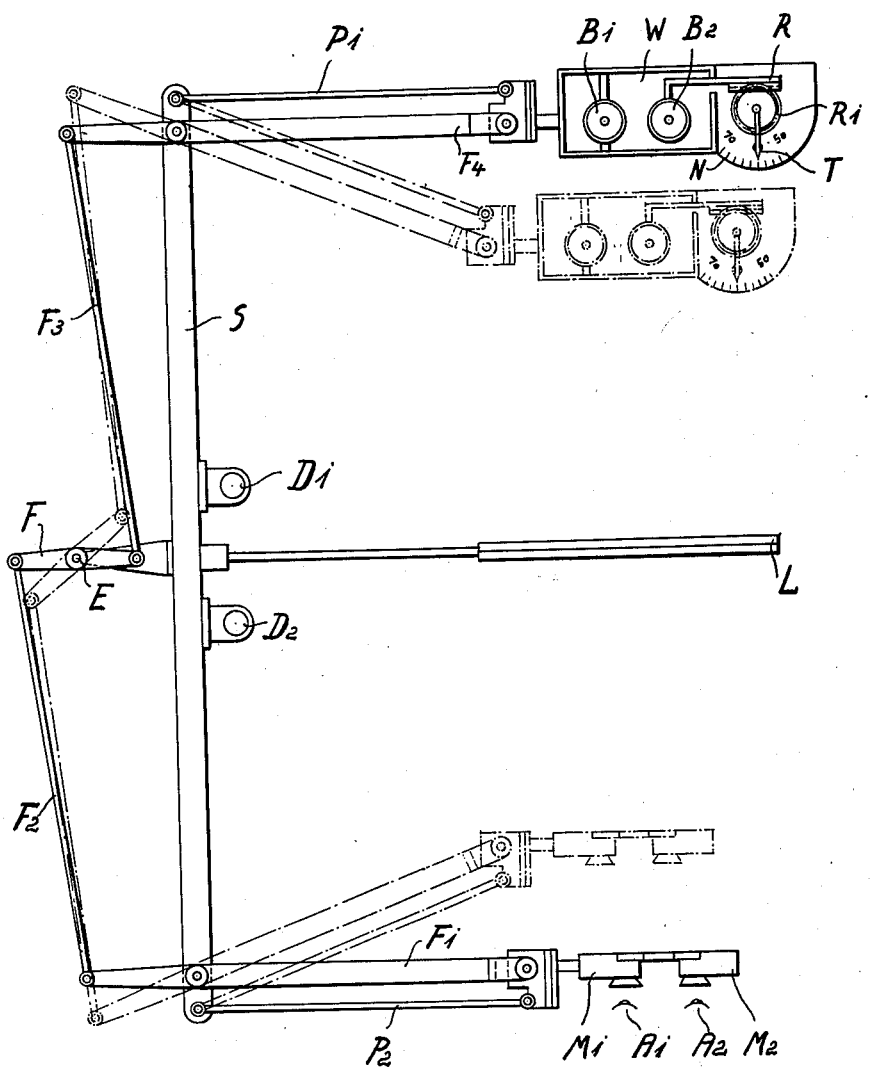

Patented Nov. 12, 1929

1,735,726

UNITED STATES PATENT OFFICE

FRITZ BORNHARDT, OF BUCHSCHLAG, HESSEN, GERMANY

DEVICE FOR STEREOSCOPIC RÖNTGEN-RAY FLUOROSCOPY

Application filed December 20, 1927, Serial No. 241,423, and in Germany December 27, 1926.

In Röntgen diagnosis fluoroscopic devices have been used for observing Röntgen images stereoscopically. These devices have not been able to produce the stereoscopic shadow image of the examined body in such a manned that under all conditions it could be seen true to nature in all its dimensions so that measurements could be made directly thereon. Such devices did not have the means of being adapted to the eyes of the observer or the distance of observation.

The object of my invention is to produce shadow images true to nature in natural size under the most varying observation conditions taking into due consideration also the varying eye spacing of different observers.

With this object in view I have found that the essential feature of my invention is that I must bring the distance of the focal spots of two Röntgen-tubes from each other and from a fluoroscopic screen and the angles made by the rays emitted from two tubes upon the screen automatically into conformity with the distance of the eyes of an observer from each other and from the screen and in conformity with the optical angles made by the eyes of the observer upon the screen.

For the purpose of more fully disclosing my invention and forming part of the specification I have illustrated in Fig. 1 an embodiment of my device.

In Fig. 1 the focal spots of two Röntgen tubes are represented by $B_1$, $B_2$, which can be adjusted towards one another to a distance of 58 to 70 mm., the tubes are to emit Röntgenray impulses alternately. For this purpose the Röntgen-tubes may be connected to a high tension alternating current in such a manner that the anode of one tube is connected with the cathode of the other tube to one high tension pole and correspondingly the other cathode and anode respectively to the other pole. When employing tubes with a valve action, for instance of the incandescent cathode type, connected in such a manner as above, the desired alternating impulses are obtained as each alternation of the high tension current flows in one direction only through each tube. It is however essential for the method of operating the tubes, even though it may be different from that explained above, that it must permit of the two focal spots being approached to within 58 to 70 mm. In front of the tubes is located a fluoroscopic screen L and in front of this a stroboscopic device with screening diaphragms $M_1$, $M_2$, which allow the left eye only to observe the image produced by the rays from the left tube on the screen and the right eye only that produced by the right tube. In order to obtain a proper stereoscopic effect in natural size, the separate pictures observed by each eye upon the screen must have the same angles of incidence in relation to the screen as the angles of the rays producing the image from each tube. The connecting lines between the focal spots $B_1$, $B_2$ and the optical centres of the eyes of the observer $A_1$, $A_2$ must therefore intersect at a point C located in the plane of the screen L. Usually these connecting lines will be located in a plane vertical to the surface of the screen. With this arrangement and proper screening by the stroboscopic device the body, to be examined located behind the screen L appears to the observer to be in front of the screen as a Röntgen-ray image in natural dimensions. Measuring instruments placed within this image enable measurements to be taken in exactly the same manner as on a transparent body which can be penetrated. By the use of transparent drawing planes divided into squares or the like any suitable cross-sections can be made through the image of the body seen and recorded in the drawing, giving the exact position of the parts of the body recorded in correct size.

However, it must be taken into account that the observer when observing a small body or part thereof will naturally endeavour to come closer with the eyes to the image of the object to be examined for accurately recognizing the details, whilst reversedly, for example in the case of a larger body, he will move his eyes away from the image for the purpose of obtaining a complete clear survey. It must be recognized that each change in the distance of the eyes from the image and screen leads to a corresponding change of the optical angles and the image can only be produced in its natural size when the angle included by the axes of the rays of the tubes upon the screen is varied to the same extent as the angle of vision of the eyes of the observer upon the screen. My invention takes this requirement into due consideration in that this equalization of all the angles of the rays is made automatic.

In the example illustrated in the drawing this operation has the effect that, expressed geometrically, the same triangular figure is formed in front of the screen as behind the screen. This requires that the focal spots of the Röntgen-tubes both as regards their common distance from the screen as also their distance apart, be adjustable from the screen and from one another according to the spacing of the optical centres of the eyes from each other and from the screen.

For this purpose the oculars of the stroboscopes $M_1$, $M_2$ and the supporting plates $W_1$, $W_2$ of the Röntgen-tubes are connected together by two gears, independent of one another, one for the longitudinal and one for the transverse adjustment. The transverse adjustment is effected by means of a cross-lever device $F_1$, $F_2$, $F_3$, $F_4$ of which the pinion E is placed in the plane of the screen L. The end pinions $F_1$, $F_2$ of the cross levers act on the limbs $S_1$, $S_3$ of angle bars the other limbs of which $S_2$, $S_4$ are guided parallel to one another. The opposed pinions $F_3$, $F_4$ act on slide plates $O_1$, $O_2$ which carry the base plates $W_1$, $W_2$ of the Röntgen tubes. A variation in the spacing of the eyes $A_1$, $A_2$ requires a corresponding variation of the pinions $F_1$, $F_2$ and thus also an adjustment of the pinions $F_3$, $F_4$ which causes the plates $W_1$, $W_2$ and thus the focal spots of the tubes $B_1$, $B_2$ to be drawn together or separated correspondingly. A rack $G_1$ joined to the angle bars $S_1$, $S_2$, $S_3$, $S_4$ at I and a rack $G_2$ joined to a bar K carrying the two base plates $W_1$, $W_2$ are in gear with a pinion Q located between them, the axis H of the pinion lying in the plane of the screen L. By means of this rack gear the Röntgen tubes with their focal spots $B_1$, $B_2$ are adjusted vertically to the screen according to the distance of the eyes of the observer from the screen.

As it is desirable during an observation both for protecting the body of the patient and the observer and for other reasons to limit the cone of rays as much as possible and as this is also desirable for the examination the tubes are either formed as so called self protecting tubes or as shown in the drawing they are provided with cones or iris—or slotted diaphragms. Is such the case the central rays of the cones must meet at a point in the plane of the screen and the observer has the impression of seeing the image through an opening of the same size and at the same distance as that of the diaphragm before the tube. The Röntgen tubes are provided with two guide rods $V_1$, $V_2$ by means of which the tubes can be turned axially around the focal spots. The tubes $T_1$, $T_2$ are guided in the sense that the central rays always intersect at the point C, when the guide bars $V_1$, $V_2$ are adjusted, irrespective of the distance between $B_1$, $B_2$ and of the distance from the screen.

A Bucky diaphragm may be placed between patient and screen in the well known manner.

Should it be desirable that the observation plane $A_1$, $A_2$, C be inclined to the plane of the screen this can be done. In this case the projection plane $B_1$, C, $B_2$ must be given the same inclination as the condition for the conformity of the angles of incidence must in every case be maintained.

The observer at the stroboscope $M_1$, $M_2$ sees the image side-reversed. Optical means are however available which reverse the image, should this be necessary. I have found reversing glass prisms very useful.

A simplification of this method of observing Röntgen stereoscopic images can be effected on the basis of the following observations.

The optical centres of the eyes of an observer can be determined by a measuring device, usually they are located between 58 and 70 millimeters. After finding the correct distance it is possible to adjust the spacing of the focal spots of the two Röntgen tubes in their holders in accordance with the eye spacing of the observer. Hence the enforced connection between the eye spacing and the tube spacing parallel to the plane of the screen when once correctly adjusted may be omitted. The automatic conformity need only be maintained in respect to the vertical distance of tubes and eyes from the plane of the screen, provided that the focal spots and eye centres both lie parallel to the plane of the screen; the optical angles are then equal at any vertical distance of the eyes from the screen. The plane of the eye centres need not always be directed absolutely parallel to the plane of the screen, an arrangement may be such that when the plane of the eye centres is inclined to the plane of the screen, the plane of the focal spots has the same inclination, in this case the image is again seen in natural size.

All that is required is an adjusting device with a scale graduation applied to one of the tube holders which shows accurately the relative spacing of the focal spots.

With the advantage a stroboscopic device is used provided with enlarged eye apertures or it may be adjustable. In the latter case it is then only necessary to adjust the stroboscope to the approximate eye spacing of each observer, the spacing of the focal spots corresponding with the eyes is set accurately by means of the graduated scale.

An embodiment of this modification is illustrated in Fig. 2.

In Fig. 2 the Röntgen tubes, of which the focal spots are indicated as $B_1$, $B_2$ are provided with adjustable spacing on the supporting plate W. The tube $B_2$ is provided with a rack R engaged with a toothed wheel $R_1$ provided with a pointer T. The pointer T moves over an adjusting scale N graduated to the eye spacing of 50 to 70 mm. By moving the Röntgen tube $B_2$ it is possible to adjust the focal spots according to the eye spacing of the observer previously determined. The enforced movement of the stroboscope $M_1$, $M_2$ provided with enlarged observation apertures for the eyes $A_1$, $A_2$ and of the focal spots $B_1$, $B_2$ vertically to the screen L is effected by means of a pivoted link-mechanism $F_1$, $F_2$, F, $F_3$, $F_4$ through the pivot E. The link rods $P_1$, $P_2$ are required to guide the Röntgen tubes or their foci and the stroboscopes parallel to the plane of the screen L when their distance is changed vertically from the screen.

The complete mechanism and the screen are supported by a bar S which glides on supporting columns in the guides $D_1$, $D_2$ which are secured to the supporting frame S and is thus adjustable in height.

What I claim is:

1. A device for Röntgen-ray stereoscopic fluoroscopy comprising two Röntgen tubes with two focal spots, a fluoroscopic screen and a stroboscopic diaphragm for the eyes of an observer, means for automatically making the distance of the focal spots from the screen and the distance of the stroboscopic diaphragm for the eyes from the screen equal.

2. A device for Röntgen-ray stereoscopic fluoroscopy comprising two Röntgen tubes with two focal spots, a fluoroscopic screen and a stroboscopic diaphragm for the eyes of an observer, means for automatically making the distance of the focal spots from the screen and the distance of the stroboscopic diaphragm for the eyes from the screen equal and means for adjusting the distance of the focal spots relative to each other and in conformity with the spacing of the eyes of an observer.

3. A device for Röntgen-ray stereoscopic fluoroscopy comprising two Röntgen tubes with two focal spots, a fluoroscopic screen and a stroboscopic diaphragm for the eyes of an observer, means for automatically making the distance of the focal spots from the screen and the distance of the stroboscopic diaphragm for the eyes from the screen equal and means for automatically adjusting the distance of the focal spots relative to each other and in conformity with the spacing of the eyes of an observer.

In testimony whereof I affix my signature.

FRITZ BORNHARDT.